United States Patent
Al Hamouz et al.

(10) Patent No.: US 12,453,956 B2
(45) Date of Patent: Oct. 28, 2025

(54) METHOD OF FORMING A SULFUR CONTAINING CROSS-LINKED POROUS POLYMER

(71) Applicant: KING FAHD UNIVERSITY OF PETROLEUM AND MINERALS, Dhahran (SA)

(72) Inventors: Othman Charles Sadeq Al Hamouz, Dhahran (SA); Mahmoud Mohamed Abdelnaby, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 739 days.

(21) Appl. No.: 17/852,893

(22) Filed: Jun. 29, 2022

(65) Prior Publication Data

US 2024/0001337 A1 Jan. 4, 2024

(51) Int. Cl.
*B01D 53/22* (2006.01)
*B01D 53/14* (2006.01)
(Continued)

(52) U.S. Cl.
CPC ........ *B01J 20/262* (2013.01); *B01D 53/1468* (2013.01); *B01D 53/1475* (2013.01);
(Continued)

(58) Field of Classification Search
CPC .. B01J 20/262; B01J 20/267; B01J 20/28061; B01J 20/2808; B01J 20/28083;
(Continued)

(56) References Cited

U.S. PATENT DOCUMENTS 3,315,013 A * 4/1967 Tocker ............... C08G 2/02
525/298
3,791,999 A * 2/1974 Yutaka ............... B01J 20/267
521/88
(Continued)

FOREIGN PATENT DOCUMENTS

CN 104610486 B 12/2017
CN 112500425 A 3/2021

OTHER PUBLICATIONS

Abdelnaby, et al. ; Novel Porous Organic Polymer for the Concurrent and Selective Removal of Hydrogen Sulfide and Carbon Dioxide from Natural Gas Streams ; ACS Applied Materials & Interfaces ; Sep. 28, 2020 ; 9 Pages.

*Primary Examiner* — Anthony R Shumate
(74) *Attorney, Agent, or Firm* — Oblon, McClelland, Maier &Neustadt, L.L.P.

(57) ABSTRACT

The method includes mixing an aldehyde and a first solvent to form a mixture. The method further includes mixing an organosulfur phenol and an aromatic compound to the mixture to form a phenol mixture and heating the phenol mixture in the presence of an acid to form a solid. The solid is dried to obtain the cross-linked porous polymer. The obtained cross-linked porous polymer has repeat pyrrole units bonded to one another, and the cross-linked porous polymer has a thiol group which separates non-adjacent pyrrole units. The cross-linked porous polymer obtained after drying is in a form of solid particles having a spherical particle structure.

15 Claims, 9 Drawing Sheets

(51) Int. Cl.
  *B01J 20/26* (2006.01)
  *B01J 20/28* (2006.01)
  *C08G 12/06* (2006.01)
  *C08G 16/02* (2006.01)

(52) U.S. Cl.
  CPC ....... *B01J 20/267* (2013.01); *B01J 20/28061* (2013.01); *B01J 20/2808* (2013.01); *B01J 20/28083* (2013.01); *C08G 12/06* (2013.01); *C08G 16/0237* (2013.01); *B01D 2253/202* (2013.01); *B01D 2257/304* (2013.01); *B01J 2257/504* (2013.01); *B01J 2220/4812* (2013.01)

(58) Field of Classification Search
  CPC ......... B01J 2220/4812; B01D 53/1468; B01D 53/1475; B01D 2253/202; B01D 2257/304; B01D 2257/504; C08G 12/06; C08G 16/0237
  See application file for complete search history.

(56) References Cited

U.S. PATENT DOCUMENTS

| | | | | |
|---|---|---|---|---|
| 4,314,033 | A * | 2/1982 | Gillan | C08G 63/54 525/11 |
| 5,288,763 | A * | 2/1994 | Li | B01J 20/3064 521/61 |
| 5,710,187 | A * | 1/1998 | Steckle, Jr. | C08J 9/28 521/64 |
| 7,635,741 | B2 * | 12/2009 | Niu | C07C 45/65 427/241 |
| 9,272,909 | B2 * | 3/2016 | Moon | C01B 32/05 |
| 10,844,156 | B2 * | 11/2020 | Al Hamouz | B01J 20/281 |
| 10,889,678 | B2 | 1/2021 | Al Hamouz et al. | |
| 11,235,306 | B2 | 2/2022 | Al Hamouz et al. | |
| 11,814,459 | B2 * | 11/2023 | Bozkurt | C08J 3/075 |
| 2017/0362389 | A1 * | 12/2017 | Liles | C08G 77/08 |
| 2019/0153190 | A1 * | 5/2019 | Seo | C08J 9/0061 |
| 2019/0336942 | A1 * | 11/2019 | Jin | B01J 20/28016 |
| 2020/0239617 | A1 * | 7/2020 | Al Hamouz | B01D 53/02 |

* cited by examiner

METHOD OF FORMING A SULFUR CONTAINING CROSS-LINKED POROUS POLYMER

BACKGROUND

Technical Field

The present disclosure generally relates to the field of polymer chemistry. More particularly, the present disclosure is related to polymer-based absorbents useful for extraction of acid gases from natural gas mixtures.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Natural gas extracted from wells usually has high quantities of contaminants and is commonly known as "sour gas". Sour gas has high concentrations of acidic compounds, predominantly, carbon dioxide ($CO_2$) and sulfur compounds like hydrogen sulfide ($H_2S$). The removal of acid gases is important as these gases generally make natural gas streams unusable, corrosive, destructive for pipelines and equipment, and decreases the heat value of natural gas.

Conventional methods of purification of natural gas are generally based on physical and/or chemical absorption methods. Physical absorption, however, is often accompanied with undesired removal of valuable hydrocarbons. Chemical absorption methods like liquid chemical scrubbing involves bubbling the natural gas through a scrubbing liquid, like an amine containing liquid. However, this technology has low efficiency, high energy consumption, and loss of solvent. As an alternate or in combination, solid bed adsorption processes are also employed. The separation of contaminant gases, especially $H_2S$, using porous sorbents having high internal surface area is preferred as potential technology due to its high adsorption capacity, selectivity, effective cost and efficient energy consumption. Conventionally used adsorbents for $H_2S$ removal include metal oxides, metals, metal organic frameworks (MOFs), zeolites, and activated carbon. However, the adsorption beds are usually suitable for adsorption of relatively small amounts of acidic compounds. Adsorption of larger amounts of acidic compounds requires the use of very large absorbent beds which in turn take relatively more time for regeneration and disproportionately high quantities of regeneration gas.

Thus, newer materials for adsorption-based purification of natural gas streams are needed. Massive attention has been paid to development of new solid, efficient sorbents with high adsorption capacity and selectivity for $CO_2$ and $H_2S$. However, polymer-based sorbent materials that are efficient for $CO_2$ and $H_2S$ removal, are limited.

In light of the aforementioned drawbacks, it is an object of the present disclosure to provide a method of forming a porous polymer for purification of natural gas streams. It is also an object of the present disclosure to provide a porous polymer-based absorbent. The disclosed method is cost-effective and yields porous polymer-based absorbent with superior adsorption capacity, selectivity, and regeneration capabilities.

SUMMARY

In an exemplary embodiment, a method to form a sulfur containing cross-linked porous polymer is disclosed. The method comprises mixing an aldehyde and a first solvent to form a mixture and mixing an organosulfur phenol and an aromatic compound to the mixture to form a phenol mixture. The method further comprises heating the phenol mixture in the presence of an acid to form a solid and drying the solid to obtain the cross-linked porous polymer. The cross-linked porous polymer has repeat pyrrole units bonded to one another, and the cross-linked porous polymer has a thiol group which separates non-adjacent pyrrole units. After the drying, the cross-linked porous polymer is in a form of solid particles having a spherical particle structure.

In some embodiments, the aldehyde is p-formaldehyde.

In some embodiments, the first solvent is dimethylformamide (DMF).

In some embodiments, the phenol is a thiophenol.

In some embodiments, the aromatic compound is a pyrrole.

In some embodiments, the acid is hydrochloric acid (HCl).

In some embodiments, the drying is from a range of 343K to 363K.

In some embodiments, heating the phenol mixture further comprises washing the solid with ammonium hydroxide, water, and methanol.

In some embodiments, the spherical particles are agglomerated, and the cross-linked porous polymer is amorphous.

In some embodiments, the spherical particles have a surface area of from 300 $m^2/g$ to 500 $m^2/g$.

In some embodiments, the sulfur containing cross-linked porous polymer has an adsorption capacity from 5 mg/g to 50 mg/g.

In some embodiments, the sulfur containing cross-linked porous polymer has a regeneration capacity of from 90% to 100%.

In some embodiments, the sulfur containing cross-linked porous polymer has a regeneration temperature of from 45° C. to 65° C.

In some embodiments, the sulfur containing cross-linked porous polymer has a microporous pore size distribution of at most 20 Å.

In some embodiments, the sulfur containing cross-linked porous polymer has a mesoporous pore size distribution of at most 50 Å.

In some embodiments, the sulfur containing cross-linked porous polymer has an isosteric heat of adsorption of $CO_2$ of from 20 kJ/mol to 80 kJ/mol.

In some embodiments, the sulfur containing cross-linked porous polymer has an uptake value of $CO_2$ at 273 K of from 10 cc/g to 60 cc/g.

In some embodiments, the sulfur containing cross-linked porous polymer has an uptake value of $CO_2$ at 298 K of from 10 cc/g to 30 cc/g.

In some embodiments, the sulfur containing cross-linked porous polymer has a dynamic uptake capacity of $CO_2$ of from 5 cc/g to 25 cc/g in dry conditions, wherein the dry conditions include a relative humidity (RH) from 1% to 10% RH.

In some embodiments, the sulfur containing cross-linked porous polymer has a dynamic uptake capacity of $CO_2$ of from 10 cc/g to 30 cc/g in wet conditions, wherein the wet conditions comprise of from a 90% RH to 100% RH.

In some embodiments, a sulfur containing cross-linked porous polymer absorbent is prepared by the method.

In some embodiments, the polymer absorbent is in a form of solid particles having a spherical particle structure.

In some embodiments, the spherical particles are agglomerated, and the polymer absorbent is amorphous.

In some embodiments, the polymer absorbent has a dynamic uptake capacity of $CO_2$ of from 5 cc/g to 25 cc/g in dry conditions, wherein the dry conditions include a relative humidity (RH) of 1% to 10% RH.

In some embodiments, the polymer absorbent has a dynamic uptake capacity of $CO_2$ of from 10 cc/g to 30 cc/g in wet conditions, wherein the wet conditions include a relative humidity (RH) of 90% to 100%.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
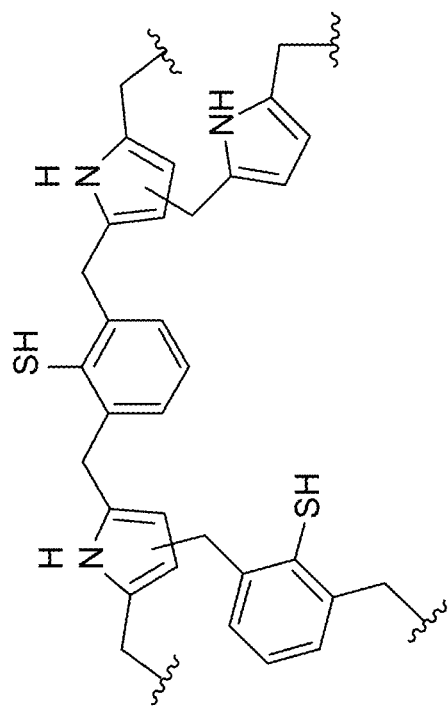
FIG. 1 shows a reaction diagram depicting a synthesis of a sulfur containing cross-linked porous polymer, according to certain embodiments.
Figure 1:
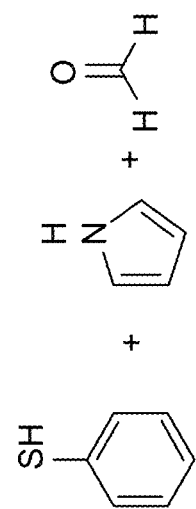

The definitions of the terms as used herein are as follows. Unless specified otherwise, these terms may be used alone or in combination with other terms in the meaning as defined.

The term "polymer" or "macromolecule" as used herein, refers to a substance made up of a plurality of repeating monomeric units. The substance may be made up of only one type of monomeric unit or more than one type of monomeric unit. The term includes, but is not limited to, homopolymers, copolymers (e.g. statistical copolymers, alternating copolymers, block copolymers, graft copolymers, gradient copolymers and the like), terpolymers, etc. The term further includes, but is not limited to, linear polymers, branched polymers, cross-linked polymers, disordered polymers, etc. The term further includes, but is not limited to, isotactic polymers, atactic polymers, syndiotactic polymers, etc. The term further includes, but is not limited to, crystalline polymers, semi-crystalline polymers, amorphous polymers, etc.

The term "amorphous" as used herein, refers to non-crystalline substances or substances which lack long-range order or substances which do not exhibit crystalline structures in X-ray or electron scattering experiments.

The term "adsorbent" as used herein, refers to a substance capable of capturing molecules or particles from a bulk fluid phase, on/in its surface, pores, or interstices. Non-limiting examples of adsorbents include silica gel, alumina, clay, colloids, activated carbon, charcoal, zeolites, or adsorption chillers.

The term "adsorbate" as used herein, refers to a substance that gets captured by the adsorbent, as defined herein.

The term "spent polymer" or "spent adsorbent" or "spent polymer adsorbent" as used herein, refers to an adsorbent saturated with an adsorbate such that the adsorbent is unable to capture any further adsorbate on/in its surface, pores, or interstices.

The term "regeneration capacity" as used herein, refers to recycling or recovery of the spent adsorbent, as defined herein, such that the adsorbent is rendered reusable for capturing adsorbate.

The term "room temperature" as used herein, refers to a temperature in range of 25±5° C.

The term "cyclic compounds" or "cyclic hydrocarbon compounds" as used herein, refers to hydrocarbons characterized by closed, saturated or unsaturated, substituted or unsubstituted, homocyclic or heterocyclic ring typically having 3 to 9 atoms. The ring may exhibit aromatic or non-aromatic behavior. Non-limiting examples of cyclic compounds include cycloheptane, benzene, cyclopropane, cyclobutane, cyclopentane, cyclohexane, 1-cyclohexene, 3-cyclohexene, cycloheptane, and the higher homologs and the like.

The term "carbocyclic compounds" or "carbocyclic rings" as used herein, refers to cyclic hydrocarbons characterized by substituted or unsubstituted, saturated or unsaturated, aromatic or non-aromatic, homocyclic hydrocarbon ring having 3 to 9 carbon atoms. Non-limiting examples of carbocyclic rings include cyclopropane, cyclobutane, cyclopentane, cyclohexane, 1-cyclohexene, 3-cyclohexene, cycloheptane, and the higher homologs and the like.

The term "aromatic compounds" or "aromatic rings" as used herein, refers to hydrocarbon rings that, in accordance with the theory of Hückel, have a cyclic, delocalized (4n+2) pi-electron system. Non-limiting examples of aromatic compounds include benzene, benzene derivatives, compounds having at least one benzene ring in their chemical structure, toluene, ethylbenzene, p-xylene, m-xylene, mesitylene, durene, 2-phenylhexane, biphenyl, phenol, aniline, nitrobenzene, benzoic acid, aspirin, paracetamol, picric acid, naphthalene, fluorene, anthracene, phenanthrene, phenalene, tetracene, chrysene, triphenylene, pyrene, pentacene, perylene, benzo[a]pyrene, corannulene, benzo[ghi]perylene, coronene, ovalene, benzo[c]fluorene, porphyrins, porphin, octaethylporphyrin, tetraphenylporphyrin, protoporyrin ix, and the like.

The term "non-aromatic compounds" or "non-aromatic rings" as used herein, refers to cyclic hydrocarbons that do not exhibit aromatic behavior. Non-limiting examples of non-aromatic compounds include 1-hexyne, 1-heptyne, 1-octyne, 1-nonyne, 1, 4-cyclohexadiene, 1, 3, 5-cycloheptatriene, 4-vinyl cyclohexene, 1, 5, 9-cyclo decatriene, and the like.

The term "alkane" as used herein, refers to hydrocarbons characterized by open, straight or branched, saturated, substituted or unsubstituted chains, typically having 1 to 22 carbon atoms. Non-limiting examples of alkanes include methane, ethane, n-propane, n-butane, t-butane, isobutane, sec-butane, n-pentane, n-hexane, n-heptane, n-octane, and the higher homologs and isomers.

The term "alkyl" includes groups derived from alkanes, as defined herein, by removal of a hydrogen atom from any carbon atom. Non-limiting examples of alkyl groups include methyl, ethyl, propyl, isopropyl, butyl, isobutyl, sec-butyl, tert-butyl, and the higher homologs and isomers.

The term "alkene" as used herein, refers to hydrocarbons characterized by open, straight or branched, unsaturated, substituted or unsubstituted chains, typically having 1 to 22 carbon atoms, such that there is at least one carbon-carbon double bond present. Non-limiting examples of alkenes include ethene, propene, 1-butene, 2-butene, isobutylene, 1-pentene, 2-pentene, 2-methyl-1-butene, 3-methyl-1-butene, 2-methyl-2-butene, and the higher homologs and isomers.

The term "alkenyl" includes groups derived from alkenes, as defined herein, by removal of a hydrogen atom from any carbon atom. Non-limiting examples of alkenyls include methenyl, ethenyl, propenyl, isopropenyl, butenyl, isobutenyl, sec-butenyl, tert-butenyl, and the higher homologs and isomers.

The term "alkyne" as used herein, refers to hydrocarbons characterized by open, straight or branched, unsaturated, substituted or unsubstituted chains, typically having 1 to 22 carbon atoms, such that there is at least one carbon-carbon triple bond present. Non-limiting examples of alkynes include, ethyne, 1-propyne, 3-propyne, 3-butyne, and the higher homologs and isomers.

The term "alkynyl" includes groups derived from alkynes, as defined herein, by removal of a hydrogen atom from any carbon atom. Non-limiting examples of alkenyls include methynyl, ethynyl, propynyl, isopropynyl, butenyl, isobutynyl, sec-butynyl, tert-butynyl, and the higher homologs and isomers.

The term "cycloalkane" as used herein, refers to monocyclic or polycyclic, saturated, substituted or unsubstituted, carbocyclic rings having 3 to 9 carbon atoms. Non-limiting examples of cycloalkanes include cyclopropane, cyclobutane, cyclopentane, cyclohexane, cycloheptane, cyclooctane and the higher homologs and isomers.

The term "cycloalkyl" includes groups derived from cycloalkanes, as defined herein, by removal of a hydrogen atom from any carbon atom of the carbocyclic ring. Non-limiting examples of cycloalkyls include cyclopropyl, cyclobutyl, cyclopentyl, cyclohexyl, cycloheptyl, cyclooctyl, and the higher homologs and isomers.

The term "cycloalkene" as used herein, refers to monocyclic or polycyclic, unsaturated, non-aromatic, substituted or unsubstituted, carbocyclic rings having 3 to 9 carbon atoms, such that there is at least one carbon-carbon double bond present in the ring. Non-limiting examples of cycloalkenes include cyclopentene, cyclopentadiene, cyclohexene, cyclohexadiene, cycloheptene, cycloheptadiene, cycloheptatriene, cyclooctene, cyclooctadiene, cyclooctatriene, cyclooctatetraene, cyclononene, cyclononadiene, cyclodecene, cyclodecadiene and the higher homologs and isomers.

The term "cycloalkenyl" includes groups derived from cycloalkenes, as defined herein, by removal of a hydrogen atom from any carbon atom of the carbocyclic ring. Non-limiting examples of cycloalkenyls include cyclopentenyl, cyclohexenyl, cycloheptenyl, cyclooctenyl, cyclononenyl, cyclodecenyl, and the higher homologs and isomers.

The term "cycloalkyne" as used herein, refers to monocyclic or polycyclic, unsaturated, non-aromatic, substituted or unsubstituted, carbocyclic rings having 3 to 9 carbon atoms, such that there is at least one carbon-carbon triple bond present in the ring. Non-limiting examples of cycloalkynes include cyclopentyne, cyclohexyne, cycloheptyne, cyclooctyne, cyclononyne, cyclodecyne, cyclodecadiyne and the higher homologs and isomers.

The term "cycloalkynyl" includes groups derived from cycloalkynes, as defined herein, by removal of a hydrogen atom from any carbon atom of the carbocyclic ring. Non-limiting examples of cycloalkynyls include cyclopentynyl, cyclohexynyl, cycloheptynyl, cyclooctynyl, cyclononynyl, cyclodecynyl, cyclodecadiynyl, and the higher homologs and isomers.

The term "arene" as used herein, refers to hydrocarbons having monocyclic or polycyclic, aromatic carbocyclic ring(s). Non-limiting examples of arenes include benzene, benzene derivatives, compounds having at least one benzene ring in their chemical structure, toluene, ethylbenzene, p-xylene, m-xylene, biphenyl, phenol, aniline, nitrobenzene, benzoic acid, and the like.

The term "aryl" includes groups derived from arenes, as defined herein, by removal of a hydrogen atom from any carbon atom of the aromatic carbocyclic ring. Non-limiting examples of aryl groups include tolyl, benzyl, phenyl, biphenyl, nitrobenzyl, ethylbenzyl, and the like.

The term "heteroatom" as used herein, refers to any atom that is not carbon or hydrogen. Non-limiting examples include oxygen, nitrogen, sulfur, etc.

The term "heterocycloalkane" includes cycloalkanes, as defined herein, having at least one heteroatom as a ring atom. Non-limiting examples of heterocycloalkanes include aziridine, oxirane, thiirane, azetidine, 1,3-diazetidine, oxetane, thietane, pyrrolidine, pyrazolidine, imidazolidine, tetrahydrofuran, 1,3-dioxolane, tetrahydrothiophene, 1,2-oxathiolane, 1,3-oxathiolane, piperidine, piperazine, tetrahydropyran, 1,4-dioxane, thiane, 1,3-dithiane, 1,4-dithiane, 1,3,5-trithiane, morpholine, thiomorpholine, pyrrolizine, decahydroisoquinoline, decahydroquinoline, oxepane, azocane, thiocane, azonane, etc.

The term "heterocycloalkyl" includes groups derived from heterocycloalkanes, as defined herein, by removal of a hydrogen atom from any atom of the ring. Non-limiting examples of heterocycloalkyls include aziridinyl, oxiranyl, thiiranyl, azetidinyl, oxetanyl, thietanyl, pyrrolidinyl, pyrazolidinyl, and the like.

The term "heteroarenes" includes arenes, as defined herein, having at least one heteroatom as a ring atom.

Non-limiting examples of heteroarene include pyrroline, pyrrole, pyrazoline, imidazoline, pyrazole, imidazole, triazole, tetrazole, furan, thiophene, oxazole, isoxazole, isothiazole, thiazole, oxadiazole, thiadiazole, pyridine, pyridazine, pyrimidine, pyrazine, triazine, pyran, dioxin, thiopyran, oxazine, thiazine, cyclopentapyrroles, pyrrolopyrroles, furopyrroles, thienopyrroles, indoline, indole, isoindole, indolizine, indazole, benzimidazole, azaindazole, pyrazolopyrimidine, purine, benzofuran, isobenzofuran, benzothiophene, benzoisoxazole, benzoisothiazole, benzoxazole, benzothiazole, benzothiadizole, tetrahydroquinoline, 1,2-dihydroquinoline, 1,2-dihydroisoquinoline, quinoline, isoquinoline, 4H-quinolizine, quinoxaline, phthalazine, quinazoline, azocine, thiepine, azepine, etc.

The term "heteroaryl" includes groups derived from heteroarenes, as defined herein, by removal of a hydrogen atom from any atom of the heteroarene ring. Non-limiting examples of heteroarene include pyrrolinyl, pyrrolyl, pyrazolinyl, imidazolinyl, pyrazolyl, imidazolyl, triazolyl, tetrazolyl, furyl, thiophenyl, oxazolyl, isoxazolyl, isothiazolyl, thiazolyl, etc.

The term "(cycloalkyl)alkyl" includes groups derived from alkyl groups substituted with at least one cycloalkyl group.

The term "(cycloalkenyl)alkyl" includes groups derived from alkyl groups substituted with at least one cycloalkenyl group.

The term "(cycloalkynyl)alkyl" includes groups derived from alkyl groups substituted with at least one cycloalkynyl group.

The term "(aryl)alkyl" includes groups derived from alkyl groups substituted with at least one aryl group.

The term "(heterocycloalkyl)alkyl" includes groups derived from alkyl groups substituted with at least one heterocycloalkyl group.

The term "(heteroaryl)alkyl" includes groups derived from alkyl groups substituted with at least one heteroaryl group.

The term "sulfur containing compound" as used herein, refers to hydrocarbons containing at least one sulfur heteroatom, or optionally $H_2S$. As defined herein, the hydrocarbon may be an alkane, an alkene, an alkyne, a cycloalkane, a cycloalkene, a cycloalkyne, an arene, a heterocycloalkane, a heteroarene, or a derivative thereof. Further, as defined herein, the hydrocarbon may be an (aryl)alkyl derivative, a (heteroaryl)alkyl derivative, a (cycloalkyl)alkyl derivative, a (cycloalkenyl)alkyl derivative, or a (cycloalkynyl)alkyl derivative. Exemplary sulfur containing compounds include thiophenol, cyclopentanethiol, cyclohexanethiol, benzyl mercaptan, 4-methylbenzenethiol, 3-methylbenzenethiol 4-phenylthiophenol, 3-phenylthiophenol, p-methylthiophenol, 2-naphthalenethiol, p-chlorothiophenol, 2,6-dimethylthiophenol, benzylmercaptan, 4,4'-bis(mercaptomethyl)biphenyl, 1,4-benzenedimethanethiol, an organosulfur phenol, etc.

In the drawings, like reference numerals designate identical or corresponding parts throughout the several views. As used herein, the words "a," "an" and the like generally carry a meaning of "one or more," unless stated otherwise. Further, the terms "approximately," "approximate," "about," and similar terms generally refer to ranges that include the identified value within a margin of 25%, 20%, 10%, or 5%, and any values therebetween. Furthermore, the terms "equal to," "substantially equal to," and similar terms generally refer to ranges that include the identified value within a margin of 75%, 80%, 85%, 90%, 95%, or 100%, and any values therebetween.

Aspects of the present disclosure are directed towards a method to form a sulfur containing cross-linked porous polymer. Further, the aspects of the present disclosure are directed towards a sulfur containing cross-linked porous polymer absorbent. Furthermore, the aspects of the present disclosure are directed towards use of a sulfur containing cross-linked porous polymer or a sulfur containing cross-linked porous polymer absorbent for removal of contaminants from natural gas streams.

In an aspect of the present disclosure, a method to form a sulfur containing cross-linked porous polymer is disclosed. The method includes mixing a cross-linker and a solvent to form a first mixture.

The cross-linker employed may be a monomeric molecule or a macromolecule comprising a plurality of monomeric molecules, capable of generating a cross-linked polymer network having desired characteristics. In some examples, the monomeric molecule may be a monofunctional hydrocarbon. A monofunctional hydrocarbon molecule may be selected from a group including, but not limited to, an aldehyde, an amine, a carboxylic acid, an acrylate, an ester, a glycol, or derivatives thereof. In some examples, the monomeric molecule may be a polyfunctional hydrocarbon. The polyfunctional hydrocarbon molecule may be a bifunctional or a trifunctional hydrocarbon molecule comprising identical functional groups, or a combination of different functional groups, wherein the functional groups may be selected from a group including, but not limited to, an aldehyde, an amine, a carboxylic acid, an acrylate, an ester, a glycol, or derivatives thereof.

The solvent utilized for preparing the first mixture may be selected based on the choice of the cross-linker or the porous polymer. In a non-limiting example, the solvent may be a polar protic solvent, a polar aprotic solvent, or a non-polar solvent. Exemplary polar protic solvent that may be used include water, methanol, ethanol, isopropyl alcohol, acetic acid, ammonia, formic acid, hydrogen fluoride, etc. Exemplary polar aprotic solvents that may be used include dichloromethane, tetrahydrofuran, ethyl acetate, acetonitrile, dimethylformamide, dimethyl sulfoxide, acetone, hexamethylphosphoric triamide, etc. Exemplary non-polar solvents that may be used include pentane, hexane, benzene, chloroform, diethyl ether, 1, 4-dioxane, toluene, xylene, ethyl acetate, methylene chloride, pyridine, etc.

The method to form a sulfur containing cross-linked porous polymer further includes mixing a sulfur containing compound and a cyclic hydrocarbon compound to the first mixture to form a second mixture. In some examples, the cyclic hydrocarbon compound is introduced to the first mixture followed by the sulfur containing compound, to form the second mixture. In some examples, the sulfur containing compound is introduced to the first mixture followed by the cyclic hydrocarbon compound, to form the second mixture. In some examples, the cyclic hydrocarbon compound and the sulfur containing compound are simultaneously added to the first mixture to form the second mixture.

The addition of the cyclic hydrocarbon compound and/or the sulfur containing compound to the first mixture may be carried out at any pace. In a non-limiting example, the addition is performed slowly, preferably taking 1 hour or more, preferably 2 hours, preferably 6 hours, preferably 12 hours, preferably 24 hours or greater. In another non-limiting example, the addition is performed rapidly, preferably less than 1 hour, preferably 50 minutes, preferably 40 minutes, preferably 30 minutes, preferably 15 minutes, preferably 10 minutes, preferably 5 minutes, or under 1 minute. In some examples, the addition is performed in a dropwise manner.

The method further includes heating the second mixture in presence of an acid to form a solid and drying the solid to obtain the cross-linked porous polymer. In some examples, drying of the solid may be carried out in a temperature range of 323 K to 363 K, preferably 325 K to 360 K, preferably 330 K to 355 K, preferably 335 K to 350 K, or 345 K. In some examples, drying of the solid may be carried out in a temperature range of 323 K to 343 K, preferably 325 K to 341 K, preferably 327 K to 339 K, preferably 329 K to 335 K, or 332 K. In some examples, drying of the solid may be carried out in a temperature range of 343 K to 363 K. preferably 345 K to 360 K, preferably 350 K to 355 K, or 353 K. Further, drying of the solid may be carried out using any conventional dryer, for example, but limited to, a dehumidifying dryer, a rotary wheel dryer, a low-pressure dryer, a vacuum dryer, a compressed air dryer, a hot air dryer, etc. In some examples, drying is performed in vacuum. In certain embodiments, the power required for drying of the solid is in a range from 100 to 10000 W, preferably 1000 to 9000 W, preferably 2000 to 8000 W, preferably 3000 to 7000 W, preferably 4000 to 6000 W, or 5000 W.

In some aspects of the present disclosure, after forming the second mixture, the method includes addition of an acid to the second mixture to form an acid mixture which is then purged with an inert gas to form a purged mixture. Exemplary inert gases usable for purging may be selected from a group including, but not limited to, nitrogen, argon, neon, krypton, xenon, radon, or helium. In certain embodiments, the acid mixture is purged with $N_2$ gas and sealed in a reaction flask to then be heated.

The method includes heating the purged mixture to form a solid. In some examples, heating of the purged mixture is done in an oil bath accompanied by continuous stirring at 90° C. or 363 K for 24 hours. In some examples, drying of the solid may be carried out in a temperature range of 323 K to 363 K, preferably 325 K to 360 K, preferably 330 K to 355 K, preferably 335 K to 350 K, or 345 K. In certain embodiments, the power required for heating the purged mixture is in a range from 100 to 10000 W, preferably 1000 to 9000 W, preferably 2000 to 8000 W, preferably 3000 to 7000 W, preferably 4000 to 6000 W, or 5000 W.

The method includes filtering of the solid to obtain a filtrate. In certain embodiments, the filter is a solid sieve, filter paper, funnel, gravity filtration, cotton, glass-wool, sand, or the like. The filtrate is subsequently subjected to washing until a clear filtrate solution is obtained. In some examples, washing is carried out multiple times using a series of solvents, such as 2 cycles, preferably 4 cycles, preferably 6 cycles, preferably 8 cycles, or 10 cycles. In a non-limiting example, the washing is carried out using at least three different types of solvents, preferably, an alcohol, water, and a hydroxide. In a non-limiting example, the washing is carried out using methanol, water, and ammonium hydroxide. In a non-limiting example, the washing is performed sequentially with (a) methanol, (b) deionized water, (c) ammonium hydroxide, (d) deionized water, and (e) methanol, until a clear filtrate is obtained.

The method further includes drying the clear filtrate to obtain the cross-linked porous polymer. In some examples, drying of the solid may be carried out in a temperature range of 323 K to 363 K, preferably 325 K to 360 K, preferably 330 K to 355 K, preferably 335 K to 350 K, or 345 K. In some examples, drying of the solid may be carried out in a temperature range of 323 K to 343 K, preferably 325 K to 341 K, preferably 327 K to 339 K, preferably 329 K to 335 K, or 332 K. In some examples, drying of the solid may be carried out in a temperature range of 343 K to 363 K. preferably 345 K to 360 K, preferably 350 K to 355 K, or 353 K. Further, drying of the solid may be carried out using any conventional dryer, for example, but limited to, a dehumidifying dryer, a rotary wheel dryer, a low-pressure dryer, a vacuum dryer, a compressed air dryer, a hot air dryer, etc. In some examples, drying is performed in vacuum. In certain embodiments, the power required for drying of the filtrate is in a range from 100 to 10000 W, preferably 1000 to 9000 W, preferably 2000 to 8000 W, preferably 3000 to 7000 W, preferably 4000 to 6000 W, or 5000 W.

In another aspect of the present disclosure, a sulfur containing cross-linked porous polymer derived from monomer units of a sulfur containing compound and a cyclic hydrocarbon compound is disclosed. The monomer units of the sulfur containing compound and the cyclic hydrocarbon compound may be linked together via a cross-linker. In some examples, the cross-linker is imidoester crosslinker dimethyl suberimidate, the N-Hydroxysuccinimide-ester crosslinker BS3, or an aldehyde. In some examples, the cross-linked porous polymer may be synthesized by carrying out a polymerization reaction between the sulfur containing compound, the cyclic hydrocarbon compound, and the cross-linker. In some examples, the polymerization reaction occurs at temperatures ranging from 0° C. to 200° C., preferably 25° C. to 175° C., preferably 50° C. to 150° C., preferably 75° C. to 125° C., or 100° C. In some examples, the polymerization occurs at pressures ranging from 0.1 to 10 MPa, preferably 1 to 9 MPa, preferably 2 to 8 MPa, preferably 3 to 7 MPa, preferably 4 to 6 MPa, or 5 MPa. In some examples, the cross-linked porous polymer may have repeat monomeric units of the cyclic hydrocarbon compound bonded to one another. As depicted in FIG. 1, there are repeat monomeric units, specifically pyrrole units, bonded together present in the synthesized cross-linked porous polymer. In some examples, the cross-linked porous polymer may have the sulfur containing compound separating non-adjacent monomeric units of the cyclic hydrocarbon compound. As depicted in FIG. 1, there is a thiol group separating two pyrrole groups present in the synthesized cross-linked porous polymer. In some embodiments, the molar ratio of pyrrole groups to thiol groups in the synthesized cross-linked porous polymer ranges from 2:1 to 10:1, preferably 3:1 to 9:1, preferably 4:1 to 8:1, preferably 5:1 to 7:1, or 6:1. In some embodiments, the molar ratio of aldehyde linkers to pyrrole groups in the synthesized cross-linked porous polymer ranges from 2:1 to 10:1, preferably 3:1 to 9:1, preferably 4:1 to 8:1, preferably 5:1 to 7:1, or 6:1. In some embodiments, the molar ratio of aldehyde linkers to thiol groups in the synthesized cross-linked porous polymer ranges from 4:1 to 20:1, preferably 6:1 to 18:1, preferably 8:1 to 16:1, preferably 10:1 to 14:1, or 12:1.

As described earlier, the cross-linker used for performing the polymerization reaction may be a monomeric molecule or a macromolecule comprising a plurality of monomeric molecules, such that the monomeric molecule may be a monofunctional hydrocarbon, a bifunctional hydrocarbon, or a trifunctional hydrocarbon.

The monomeric unit of the sulfur containing compound may be a compound of formula (I):

$$R_1\text{—}S\text{—}R_2 \qquad (I)$$

where:
R₁—is selected from a group including substituted or unsubstituted alkyl, substituted or unsubstituted alkenyl, substituted or unsubstituted alkynyl, substituted or unsubstituted cycloalkyl, substituted or unsubstituted cycloalkenyl, substituted or unsubstituted cycloalkynyl, substituted or unsubstituted aryl, substituted or unsubstituted heterocycloalkyl, substituted or unsubstituted heteroaryl, substituted or unsubstituted (cycloalkyl)alkyl, substituted or unsubstituted (cycloalkenyl)alkyl, substituted or unsubstituted (cycloalkynyl)alkyl, substituted or unsubstituted (aryl)alkyl, substituted or unsubstituted (heterocycloalkyl)alkyl, substituted or unsubstituted (heteroaryl)alkyl, or derivatives thereof.

R₂ is selected from a group including, but not limited to, —H, —OH, —C≡N, —N≡C, —O—R₃, —R₃;

wherein:
R3 is identical to R₁ or is independently selected from a group including, but not limited to, substituted or unsubstituted alkyl, substituted or unsubstituted alkenyl, substituted or unsubstituted alkynyl, substituted or unsubstituted cycloalkyl, substituted or unsubstituted cycloalkenyl, substituted or unsubstituted cycloalkynyl, substituted or unsubstituted aryl, substituted or unsubstituted heterocycloalkyl, substituted or unsubstituted heteroaryl, substituted or unsubstituted (cycloalkyl)alkyl, substituted or unsubstituted (cycloalkenyl)alkyl, substituted or unsubstituted (cycloalkynyl)alkyl, substituted or unsubstituted (aryl)alkyl, substituted or unsubstituted (heterocycloalkyl)alkyl, substituted or unsubstituted (heteroaryl)alkyl, or derivatives thereof.

In a non-limiting example, the compound of formula (I) may be selected from a group of organosulfur compounds including, a thiol derivative, a sulfide derivative, a sulfenic acid derivative, a thiocyanate derivative, a carbothioic S-acid derivative, a thiolester derivative, or a dithiocarboxylic acid derivative. In some examples, the compound of formula (I) is selected from a group including, thiophenol, cyclopentanethiol, cyclohexanethiol, benzyl mercaptan, 4-methylbenzenethiol, 3-methylbenzenethiol, 4-phenylthiophenol, 3-phenylthiophenol, a thiol substituted naphthalene, or a thiol substituted anthracene.

The monomeric unit of the cyclic hydrocarbon compound may be a selected from a group including, but not limited to, substituted or unsubstituted cycloalkyl, substituted or unsubstituted cycloalkenyl, substituted or unsubstituted cycloalkynyl, substituted or unsubstituted aryl, substituted or unsubstituted heterocycloalkyl, substituted or unsubstituted heteroaryl, substituted or unsubstituted (cycloalkyl)alkyl, substituted or unsubstituted (cycloalkenyl)alkyl, substituted or unsubstituted (cycloalkynyl)alkyl, substituted or unsubstituted (aryl)alkyl, substituted or unsubstituted (heterocycloalkyl)alkyl, substituted or unsubstituted (heteroaryl)alkyl, or derivatives thereof.

In some examples, the cyclic hydrocarbon compound may be selected from a compound of formula (II-a) to a compound of formula (II-g):

[Formula II-a]

[Formula II-b]

[Formula II-c]

[Formula II-d]

[Formula II-e]

[Formula II-f]

[Formula II-g]

where:
the dashed lines (‑‑‑‑) in any of the formulae from formula (II-a) to formula (II-g) represent single or double bonds;

—X— is selected from a group including, but not limited to, —O—, —S—, —N—, —O(R₄)—, —S(R₄)—, or —N(R₄)—;

wherein R₄ is hydrogen, substituted or unsubstituted alkyl, substituted or unsubstituted alkenyl, substituted or unsubstituted alkynyl, substituted or unsubstituted cycloalkyl, substituted or unsubstituted cycloalkenyl, substituted or unsubstituted cycloalkynyl, substituted or unsubstituted aryl, substituted or unsubstituted heterocycloalkyl, substituted or unsubstituted heteroaryl, substituted or unsubstituted (cycloalkyl)alkyl, substituted or unsubstituted (cycloalkenyl)alkyl, substituted or unsubstituted (cycloalkynyl)alkyl, substituted or unsubstituted (aryl)alkyl, substituted or unsubstituted (heterocycloalkyl)alkyl, substituted or unsubstituted (heteroaryl)alkyl, or derivatives thereof;

It may be noted that the heterocyclic rings of formula (II-a) to (II-g) may be non-aromatic or aromatic hydrocarbon rings. Further, any of the carbon atoms present in the rings of formula (II-a) to (II-g) may be unsubstituted or substituted. It may also be noted that any of the heteroatoms atoms, denoted by X, present in the rings of formula (II-a) to (II-g) may be unsubstituted or substituted.

In a non-limiting example, the compound of formula (II-a) may be selected from pyrrolidine, pyrroline, pyrrole, or a derivative thereof. In a non-limiting example, the compound of formula (II-b) may be selected from piperidine, pyridine, or a derivative thereof. In a non-limiting example, the compound of formula (II-c) may be selected from imidazolidine, imidazole, or a derivative thereof. In a non-limiting example, the compound of formula (II-d) may be selected from pyrimidine, or a derivative thereof. In a non-limiting example, the compound of formula (II-e)

be selected from piperazine, pyrazine, or a derivative thereof. In a non-limiting example, the compound of formula (II-f) may be selected from 1,2,4-triazine or derivatives thereof. In a non-limiting example, the compound of formula (II-g) may be selected from 1,3,5-triazine, or a derivative thereof.

In another aspect of the present disclosure, a sulfur containing cross-linked porous polymer absorbent is disclosed. The cross-linked porous polymer synthesized by the methods of present disclosure is in form of solid particles having a spherical particle structure, acting as an absorbent. In some examples, the solid particles of the cross-linked porous polymer may be packed in a column or attached to a support column which may be used as an absorbent column for removing acid gases from natural gas streams.

Now, the method of forming a sulfur containing cross-linked porous polymer will be described in more detail. In one aspect of the present disclosure, the method includes mixing an aldehyde and a first solvent to form a mixture. The method includes mixing a phenol and an aromatic compound to the mixture, to form a phenol mixture, and heating the phenol mixture in the presence of an acid to form a solid. The solid is dried to obtain the cross-linked porous polymer.

In some examples, the aldehyde and the first solvent are p-formaldehyde and dimethylformamide (DMF), respectively. In a non-limiting example, the mixing of p-formaldehyde and DMF is performed at room temperature by stirring for at least one minute, at least 2 minutes, at least 4 minutes, at least 6 minutes, at least 8 minutes, at least 10 minutes, at least 15 minutes, at least 30 minutes, at least 45 minutes, or at least 1 hour. In some examples, the mixing is performed by stirring at room temperature for 10 minutes.

In some examples, the phenol and the aromatic compound are thiophenol and pyrrole, respectively. In a non-limiting example, thiophenol and pyrrole are added to the mixture sequentially and in a dropwise manner to form the phenol mixture. In some examples, the dropwise addition occurs for preferably less than 1 hour, preferably 50 minutes, preferably 40 minutes, preferably 30 minutes, preferably 15 minutes, preferably 10 minutes, preferably 5 minutes, or under 1 minute.

In some examples, the phenol mixture is heated in presence of HCl to form the solid. In non-limiting examples, the mixture is heated with an acid such as $H_2SO_4$, HBr, $HNO_3$, $CH_3COOH$, $H_2CO_3$, $H_3PO_4$, $HClO_4$, HI, $HClO_3$, or other strong acids of the like. In some examples, the phenol mixture is heated in presence of HCl at 90° C. or 363 K. Further, in a non-limiting example, after incorporation of HCl into the phenol mixture, an acid mixture is formed, which is purged with nitrogen gas to form a purged mixture. Non-limiting example of inert gases usable for purging may be selected from a group including, but not limited to, nitrogen, argon, neon, krypton, xenon, radon, or helium. The purged mixture is then heated in an oil bath accompanied by continuous stirring at 90° C. or 363 K for 24 hours to form the solid. In some examples, the oil bath operates in temperatures ranging from 0° C. to 500° C., preferably 75° C. to 425° C., preferably 150° C. to 350° C., preferably 200° C. to 300° C., or 250° C.

In some examples, the solid is dried to obtain the cross-linked porous polymer. In certain embodiments, the temperature required for drying of the solid is in a temperature range from 100° C. to 500° C., preferably 150° C. to 450° C., preferably 200° C. to 400° C., preferably 250° C. to 350° C., or 300° C. In certain embodiments, the time required for drying of the solid is in a range from 12 hours to 48 hours, preferably 16 hours to 44 hours, preferably 20 hours to 40 hours, preferably 24 hours to 36 hours, preferably 28 hours to 32 hours, or 30 hours. Non-limiting examples of the drying medium include any conventional dryer, for example, but limited to, a dehumidifying dryer, a rotary wheel dryer, a low-pressure dryer, a vacuum dryer, a compressed air dryer, a hot air dryer, etc. In some examples, drying is performed in vacuum. In a non-limiting example, the solid is firstly filtered to obtain a filtrate which is subsequently subjected to multiple washings, preferably 2 washes, preferably 4 washes, preferably 6 washes, preferably 8 washes, or 10 washes. In certain embodiments, the filter is a solid sieve, filter paper, funnel, gravity filtration, cotton, glass-wool, sand, or the like. Washing is performed sequentially with (a) methanol, (b) deionized water, (c) ammonium hydroxide, (d) deionized water, and (e) methanol, until a clear filtrate is obtained which is then dried to obtain the cross-linked porous polymer.

In some examples, drying is carried out in a temperature range of 323 K to 363 K under vacuum, preferably 330 K to 360 K, preferably 340 K to 350 K, or 345 K.

The obtained cross-linked porous polymer comprising thiophenol and pyrrole as monomeric units and p-formaldehyde as cross-linker, has repeat pyrrole units bonded to one another, and thiophenol units which separates non-adjacent pyrrole units. As depicted in FIG. 1, there are repeat monomeric units, specifically pyrrole units, bonded together present in the synthesized cross-linked porous polymer. As depicted in FIG. 1, there is a thiol group separating two pyrrole groups present in the synthesized cross-linked porous polymer. In some embodiments, the molar ratio of pyrrole groups to thiol groups in the synthesized cross-linked porous polymer ranges from 2:1 to 10:1, preferably 3:1 to 9:1, preferably 4:1 to 8:1, preferably 5:1 to 7:1, or 6:1. In some embodiments, the molar ratio of aldehyde linkers to pyrrole groups in the synthesized cross-linked porous polymer ranges from 2:1 to 10:1, preferably 3:1 to 9:1, preferably 4:1 to 8:1, preferably 5:1 to 7:1, or 6:1. In some embodiments, the molar ratio of aldehyde linkers to thiol groups in the synthesized cross-linked porous polymer ranges from 4:1 to 20:1, preferably 6:1 to 18:1, preferably 8:1 to 16:1, preferably 10:1 to 14:1, or 12:1.

Figure 5A:
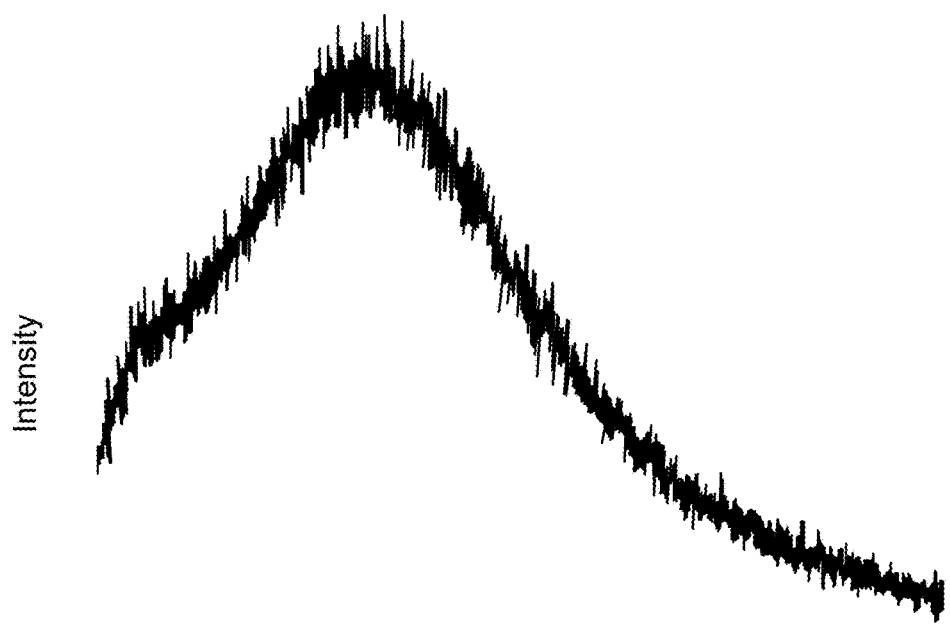
FIG. 5A shows Powder X-ray diffraction (PXRD) plot depicting a spectrum of a sulfur containing cross-linked porous polymer, according to certain embodiments.
Figure 5B:
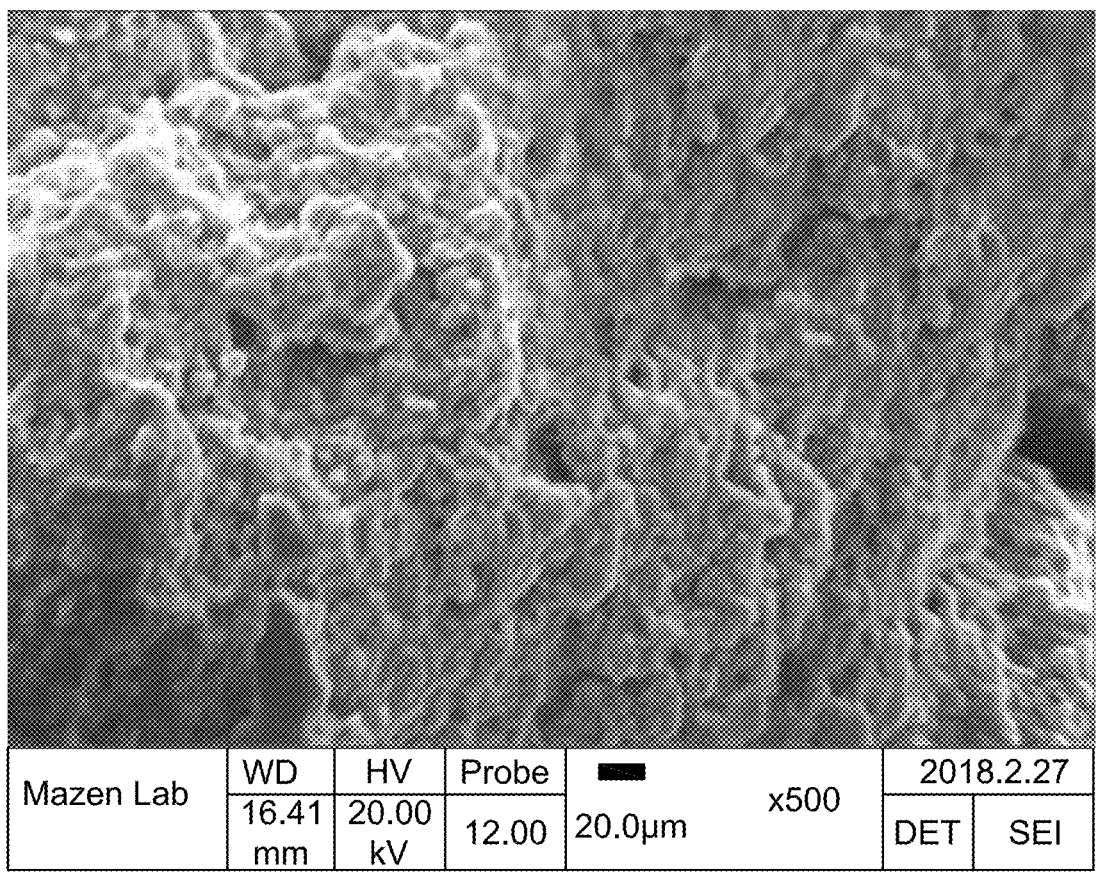
FIG. 5B shows FESEM image of a sulfur containing cross-linked porous polymer, according to certain embodiments.

The cross-linked porous polymer obtained is amorphous in nature and the polymer is in a form of solid particles having a spherical particle structure. As seen in FIG. 5B, the solid particles are clumped together and the particles themselves take on a spherical shape throughout the polymer. In some examples, the cross-linked porous polymer is adapted in form of a cross-linked porous absorbent comprised of solid particles having a spherical particle structure. In some examples, the spherical particles are agglomerated and have a surface area of from 300 $m^2$/g to 500 $m^2$/g, preferably 325 $m^2$/g to 475 $m^2$/g, preferably 350 $m^2$/g to 450 $m^2$/g, preferably 3375 $m^2$/g to 425 $m^2$/g, or 400 $m^2$/g, In some examples, the cross-linked porous polymer or the cross-linked porous polymer absorbent has an adsorption capacity of $H_2S$ per gram of cross-linked porous polymer of from 5 mg/g to 50 mg/g, preferably 10 mg/g to 45 mg/g, preferably 15 mg/g to 40 mg/g, preferably 20 mg/g to 35 mg/g, preferably 25 mg/g to 30 mg/g, or 27.5 mg/g. In some examples, the cross-linked porous polymer or the cross-linked porous polymer absorbent has a regeneration capacity of from 90% to 100%, preferably 91% to 99%, preferably 92% to 98%, preferably 93% to 97%, preferably 94% to 96%, or 95% and a regeneration temperature of from 45° C. to 65° C., preferably 47.5° C. to 62.5° C., preferably 50° C. to 60° C., preferably 52.5° C. to 57.5° C., or 55° C.

In some examples, the cross-linked porous polymer or the cross-linked porous polymer absorbent has a microporous pore size distribution of at most 20 Å, preferably at most 25 Å, preferably at most 30 Å, preferably at most 35 Å, preferably at most 40 Å, preferably at most 45 Å, or 50 Å and a mesoporous pore size distribution of at most 50 Å, preferably at most 60 Å, preferably at most 70 Å, preferably at most 80 Å, preferably at most 90 Å, or 100 Å In some examples, the cross-linked porous polymer or the cross-linked porous polymer absorbent has an isosteric heat of adsorption of $CO_2$ of from 20 kJ/mol to 80 kJ/mol, preferably 25 kJ/mol to 75 kJ/mol, preferably 30 kJ/mol to 70 kJ/mol, preferably 35 kJ/mol to 65 kJ/mol, preferably 40 kJ/mol to 60 kJ/mol, preferably 45 kJ/mol to 55 kJ/mol, or 50 kJ/mol.

In some examples, the cross-linked porous polymer or the cross-linked porous polymer absorbent has an uptake value of $CO_2$ at 273 K of from 10 cc/g to 60 cc/g, preferably 15 cc/g to 55 cc/g, preferably 20 cc/g to 50 cc/g, preferably 25 cc/g to 45 cc/g, preferably 30 cc/g to 40 cc/, or 35 cc/g; an uptake value of $CO_2$ at 298 K of from 10 cc/g to 30 cc/g, preferably 12.5 cc/g to 27.5 cc/g, preferably 15 cc/g to 25 cc/g, preferably 17.5 cc/g to 22.5 cc/g, or 20 cc/g; a dynamic uptake capacity of $CO_2$ of from 5 cc/g to 25 cc/g in dry conditions (1% relative humidity to 10% relative humidity), preferably 7.5 cc/g to 22.5 cc/g, preferably 10 cc/g to 20 cc/g, preferably 12.5 cc/g to 17.5 cc/g, or 15 cc/g; and a dynamic uptake capacity of $CO_2$ of from 10 cc/g to 30 cc/g in wet conditions (90% relative humidity to 100% relative humidity) preferably 12.5 cc/g to 27.5 cc/g, preferably 15 cc/g to 25 cc/g, preferably 17.5 cc/g to 22.5 cc/g, or 20 cc/g.

EXAMPLES

The present disclosure is further described by the following examples. These are not intended to limit the scope of the disclosure but represent some preferred aspects of the present disclosure.

Example 1

Preparation of Sulfur Containing Cross-Linked Porous Polymer

Pyrrole (98% purity), paraformaldehyde (>99% purity), methanol (99.9% purity), hydrochloric acid (37% w/w), N,N-dimethylformamide (99% purity), thiophenol (99% purity), and ammonium hydroxide (25% w/w) were used. Pyrrole and thiophenol were distilled under nitrogen flow at 130° C. and 160° C. respectively, then both were stored under nitrogen environment at 0° C. until they were used. All other reagents were used as received without further purification.

Referring to FIG. 1, a reaction diagram is shown depicting a synthesis of the sulfur containing cross-linked porous polymer. As shown, the sulfur-containing porous polymer was synthesized by a polycondensation reaction amongst thiophenol, pyrrole, and paraformaldehyde as a linker. Paraformaldehyde (1.80 g, 60 mmol) was stirred in 50 mL of DMF in a 100 mL round bottom flask and stirred at room temperature for 10 minutes. Pyrrole (2.01 g, 30 mmol) was added dropwise to the reaction flask followed by thiophenol (1.10 g, 10 mmol). The reaction mixture was stirred for 10 minutes. Concentrated HCl (0.6 ml, 12 M) was added to the reaction mixture and the reaction flask was purged with $N_2$ gas and sealed. The reaction was then heated with continuous stirring in an oil bath to 363 K for 24 hours. Upon completion of the reaction time, a black solid was filtered and washed, sequentially with (a) methanol, (b) deionized water, (c) ammonium hydroxide, (d) deionized water, and (e) finally thoroughly washed with methanol until a clear filtrate solution was obtained. The clear filtrate was dried under vacuum at 333 K until a constant weight was achieved (3.46 g, yield: 70% based on monomer weights).

Example 2

Fourier-Transform Infrared (FTIR) Spectroscopic Analysis

Fourier transform infrared (FTIR) spectroscopy measurements were performed from KBr pellets using a PerkinElmer 16 PC spectrometer. The spectrum was recorded over 4000-600 $cm^{-1}$ in transmission mode and the output signals were described as follows: s, strong; m, medium; w, weak; and br, broad.

FTIR (KBr, 4000-500 $cm^{-1}$) of the sulfur containing cross-linked porous polymer: peaks observed at 3442 $cm^{-1}$ (br), 2921 $cm^{-1}$ (w), 2512 $cm^{-1}$ (w), 1637 $cm^{-1}$ (m), 1435 $cm^{-1}$ (m), 1405 $cm^{-1}$ (w), 1305 $cm^{-1}$ (w), 1124 $cm^{-1}$ (m), 1037 $cm^{-1}$ (m).

Figure 2:
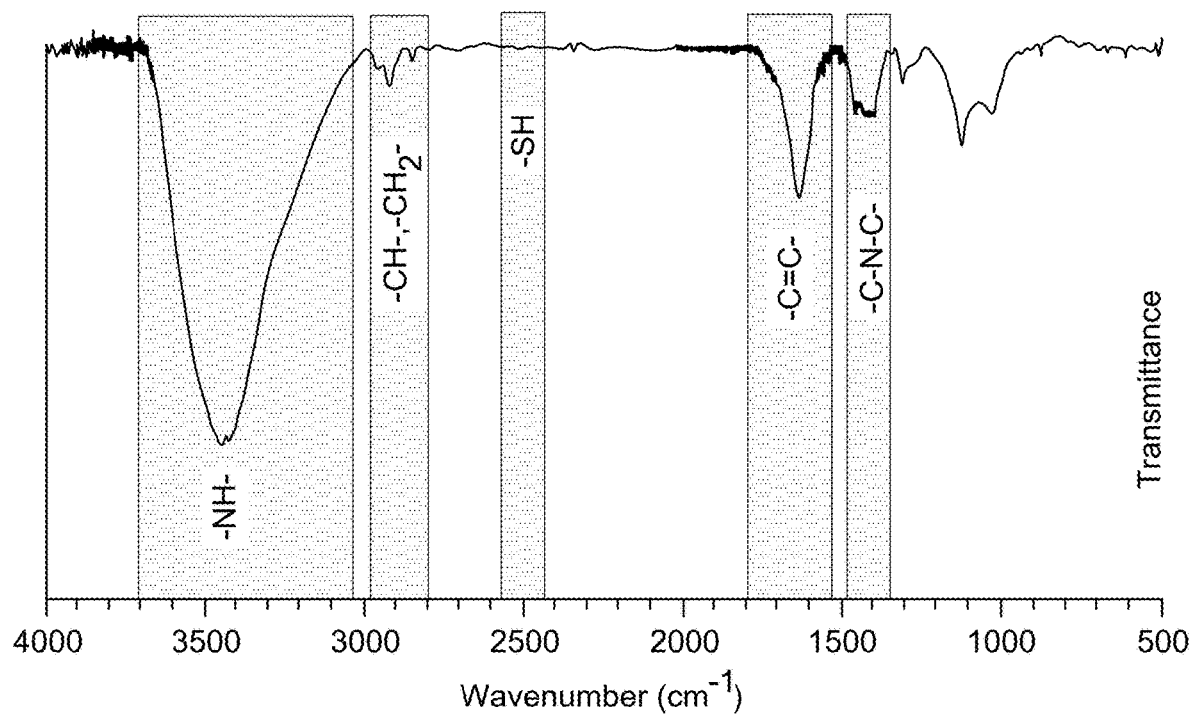
FIG. 2 shows a FTIR plot of a sulfur containing cross-linked porous polymer, according to certain embodiments.

Referring to FIG. 2, the FTIR spectrum of the sulfur containing cross-linked porous polymer is shown. The spectrum shows a strong, broad band at approximately 3442 $cm^{-1}$, attributed to the —NH— stretching vibrations with overlap with the —OH stretching found in trapped water molecules. A weak band at approximately 2921 $cm^{-1}$ is attributed to the stretching vibrations of the C—H and —$CH_2$— methylene linkages that are absent in thiophenol and pyrrole monomers. A medium band at approximately 1637 $cm^{-1}$ is attributed to the —C=C— aromatic stretching vibrations found in thiophenol. A peak at approximately 1435 $cm^{-1}$ is attributed to the —C—N—C— stretching vibrations in the pyrrole moiety. A weak band at approximately 2512 $cm^{-1}$, which is barely perceivable, could be attributed to the —SH stretching vibrations found in thiophenol.

Example 3

CP-CMAS $^{13}$C NMR Spectrum Analysis $^{13}$C solid-state nuclear magnetic resonance (NMR) spectroscopy measurements were performed on a Bruker 400 MHz spectrometer operating at 125.65 MHz (11.74 T) and ambient temperature (298 K). Samples of the cross-linked porous polymer were packed into 4 mm $ZrO_2$ rotors, and cross-polarization magic angle spinning (CP-MAS) was employed with a pulse delay of 5.0 s and a magic angle spinning rate of 14 kHz.

Elemental analysis calculated (%) for $C_{24}H_{27}N_3S_2$: C, 74.00; H, 6.99; N, 10.79; S, 8.23. Elemental analysis found (%): C, 34.53; H, 4.16; N, 8.29; S, 1.65.

The elemental analysis of the cross-linked porous polymer showed a significant deviation from the proposed/calculated values, and that can be expected in case of the synthesized cross-linked porous polymer. This could be related to the incomplete combustion, and the presence of trapped gas molecules and water vapors.

Figure 3:
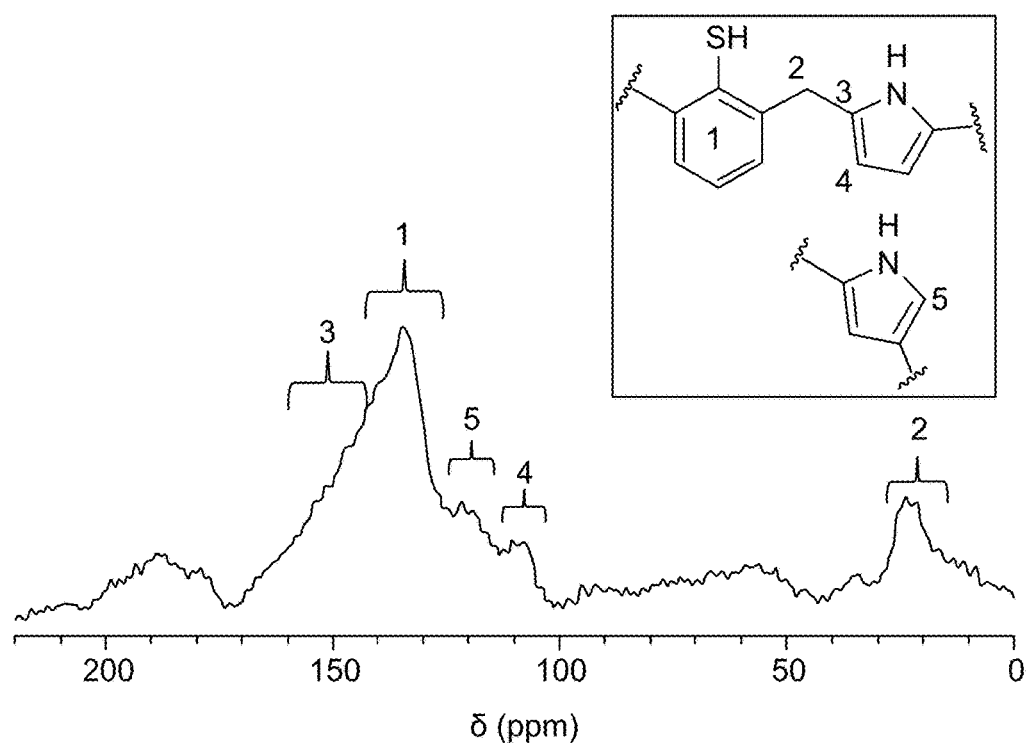
FIG. 3 shows a CP-CMS $^{13}C$ NMR spectrum of a sulfur containing cross-linked porous polymer, according to certain embodiments.

Referring to FIG. 3, the $^{13}$C NMR spectrum of the cross-linked porous polymer is shown. The spectrum reveals a broad peak at approximately 129 ppm which is attributed to the aromatic C atoms found in thiophenol. A shoulder peak at approximately 140 ppm is attributed to the αC atom linked directly to the nitrogen atom in the pyrrole moiety. A peak at approximately 110 ppm is attributed to the βC atom in the pyrrole moiety and a shoulder peak at approximately 120 ppm is attributed to the αC atom not connected to the methylene linkage between the pyrrole and thiophenol moieties. A peak at approximately 25 ppm is attributed to the C atom found in the methylene bridge between the thiophenol and pyrrole moieties. The spectrum agrees with the structure of the cross-linked porous polymer shown in FIG. 1, confirming the formation of the cross-linked porous polymer.

Example 4

Thermogravimetric Analysis (TGA)

Thermogravimetric analysis (TGA) was done on a TA Q-500 instrument with a platinum pan sample holder under air flow with a 10° C. per min heating rate.

Figure 4:
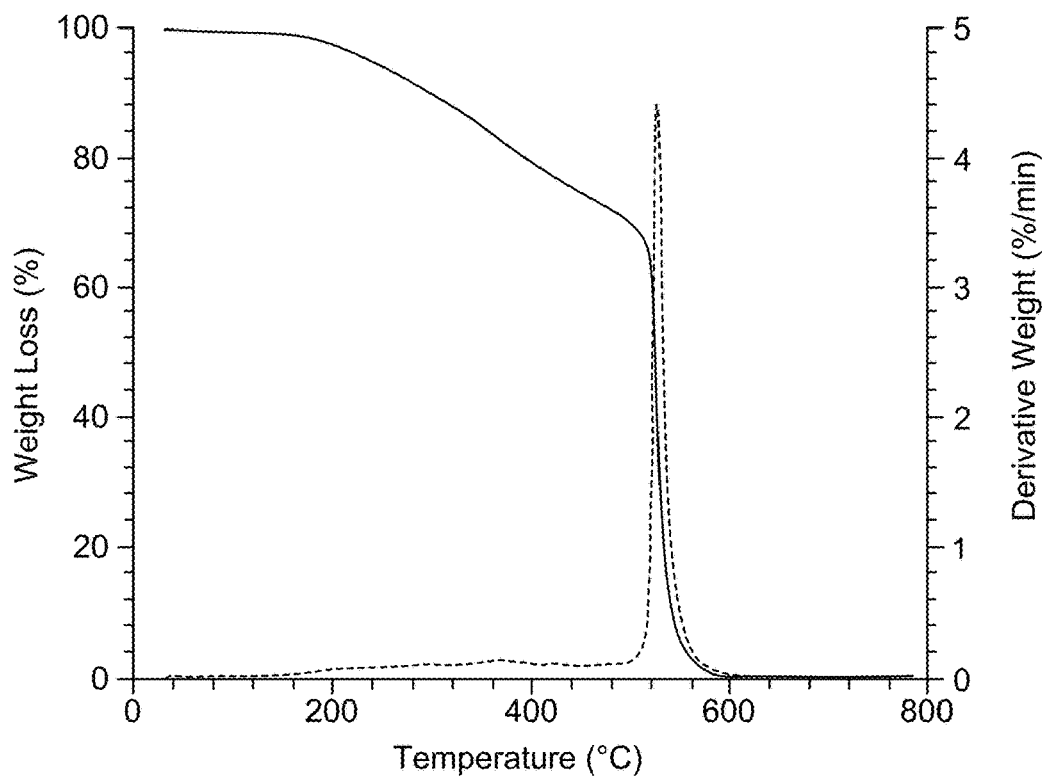
FIG. 4 shows a TGA thermogram of a sulfur containing cross-linked porous polymer along with the first derivative of the thermogram, according to certain embodiments.

Referring to FIG. 4, the thermogram of the cross-linked porous polymer under air flow along with the first derivative of the thermogram is shown. The thermogram and its first derivative reveals that the synthesized polymer is stable up to 200° C. After that, increased weight loss is observed. This weight lost is attributed to the volatile impurities like gaseous and adsorbed water molecules trapped in the polymeric network which are released at higher temperatures. This loss of volatile impurities coincides with the deviated results obtained by the elemental analysis. Also, this could be attributed to rearrangement of the polymeric chains to a more stable conformation. At approximately 545° C., the thermogram reveals the decomposition point of the synthesized polymer. The results show that the synthesized polymer is thermally stable.

Example 5

Powder X-Ray Diffraction (PXRD) Pattern and FESEM-EDX Analysis

Powder X-ray diffraction (PXRD) measurements were carried out using a Rigaku MiniFlex II X-ray diffractometer with Cu Kα radiation ($\lambda$=1.54178 Å). Field emission scanning electron microscope (FESEM) images were taken on a Tescan LYRA3 Dual Beam microscope at an acceleration voltage of 10 kV.

Figure 5C:
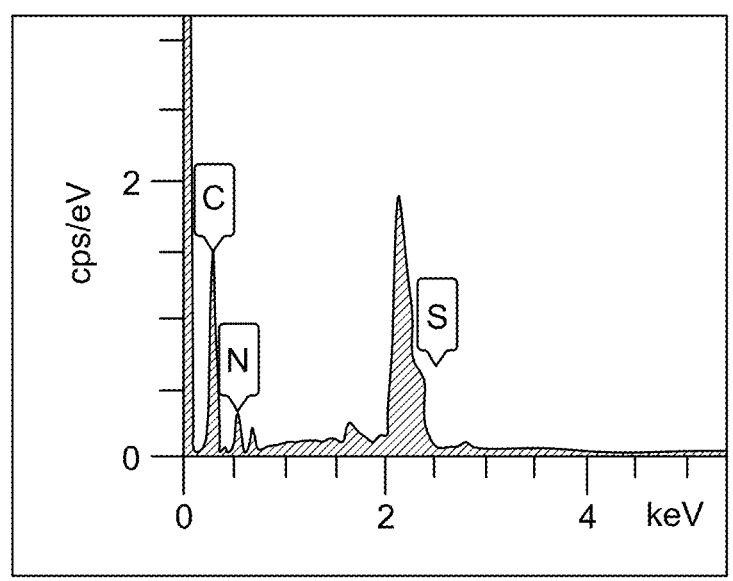
FIG. 5C shows EDX graph of a sulfur containing cross-linked porous polymer, according to certain embodiments.

The morphology and crystallinity of the cross-linked porous polymer were analyzed by PXRD and FESEM-EDX. Referring to FIG. 5A, PXRD pattern of the synthesized polymer is revealed. Referring to FIG. 5B, FESEM image of the synthesized polymer is depicted. Referring to FIG. 5C, EDX plot of the synthesized polymer is shown.

In FIG. 5A, a broad peak at approximately 20° 2θ indicates the amorphous nature of the synthesized polymer. In FIG. 5B, the FESEM image reveals that the synthesized polymer has a spherical particle structure, and these particles are agglomerated to each other in an amorphous structure. This coincides with the PXRD pattern shown in FIG. 5A and could explain the deviation in the elemental analysis. In FIG. 5C, the EDX graph reveals the presence of all the elements proposed in the synthesized polymer's structure.

Example 6

Porosity and Textural Properties

Low-pressure nitrogen sorption isotherms were collected on a Micromeritics ASAP 2020. A liquid nitrogen bath was used for the measurements at 77 K. $CO_2$, $CH_4$, and $N_2$ sorption isotherms were prepared on an Autosorb iQ2 volumetric gas adsorption analyzer. The measurement temperatures of 273 K and 298 K were controlled with a water circulator.

Figure 6:
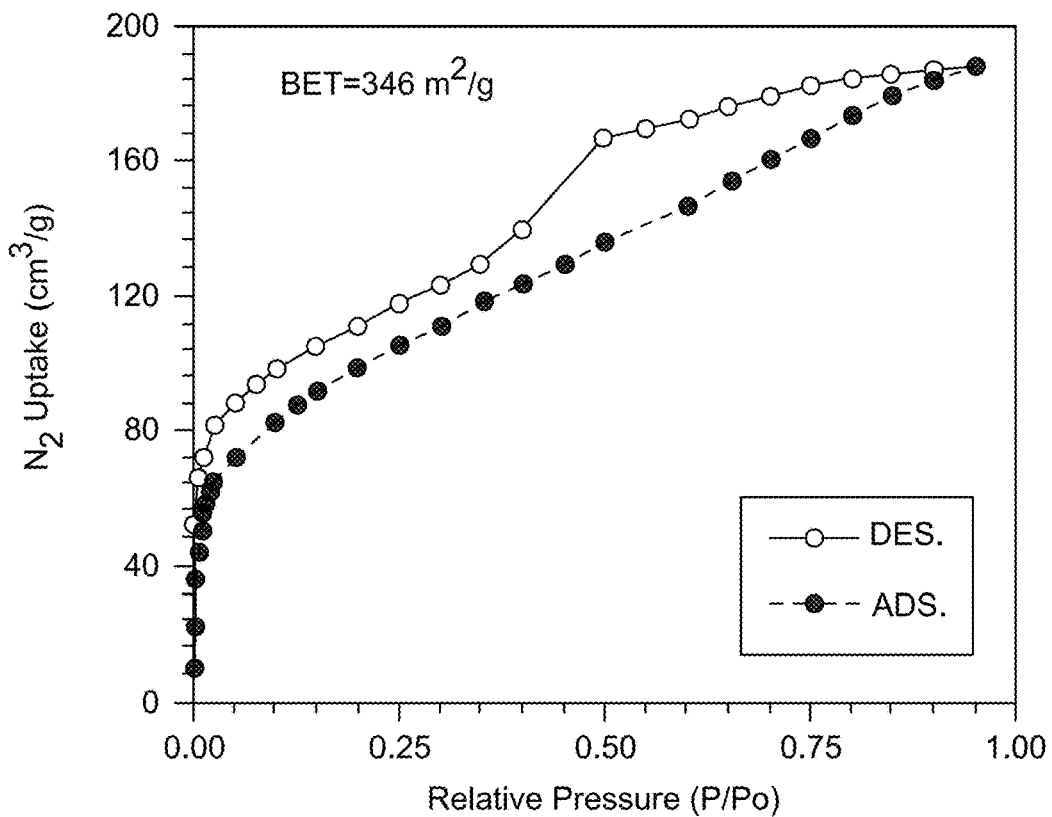
FIG. 6 shows $N_2$ adsorption/desorption isotherm of a sulfur containing cross-linked porous polymer at 273 K, according to certain embodiments.

Referring to FIG. 6, the $N_2$ adsorption/desorption isotherm of the cross-linked porous polymer at 77 K is shown. The permanent porosity of the cross-linked porous polymer was evaluated using the adsorption/desorption $N_2$ isotherm. The isotherm reveals that the synthesized polymer adopts Type IV isotherm, has micro- and meso-pores with a BET surface area of 346 m$^2$/g. The isotherm reveals a rapid uptake at very low relative pressure ($P/P_o$<0.05) due to the presence of micropores, followed by an incremental increase in the $N_2$ uptake due to the presence of mesopores ($P/P_o$>0.05). The hysteresis observed in the desorption isotherm is mainly due to the amorphous nature of the synthesized polymer.

Figure 7:
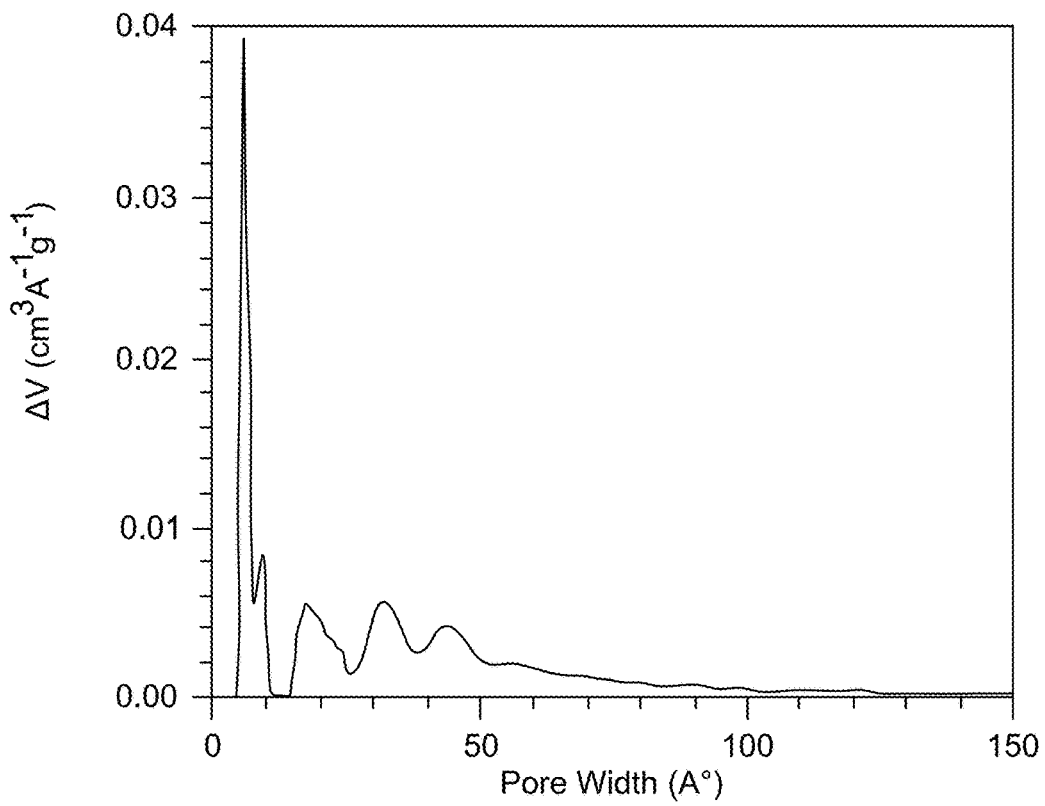
FIG. 7 shows DFT pore size distribution of a sulfur containing cross-linked porous polymer, according to certain embodiments.

Referring to FIG. 7, a pore size distribution of the cross-linked porous polymer is shown. As shown in FIG. 7, the micro- and meso-pores are further confirmed by the QSDFT calculation. The calculation reveals a microporous pore size distribution at below 20 Å and a mesoporous pore size distribution at below 50 Å, as shown by the multiple broad peaks.

Example 7

$CO_2$ Uptake Evaluation

Due to the permanent porosity and presence of amine and sulfur groups (—NH— and —SH), the cross-linked porous polymer of example 1 has a high affinity toward $CO_2$. Adsorption/desorption experiments were conducted to evaluate the efficiency of synthesized polymer in gas purification.

Figure 8:
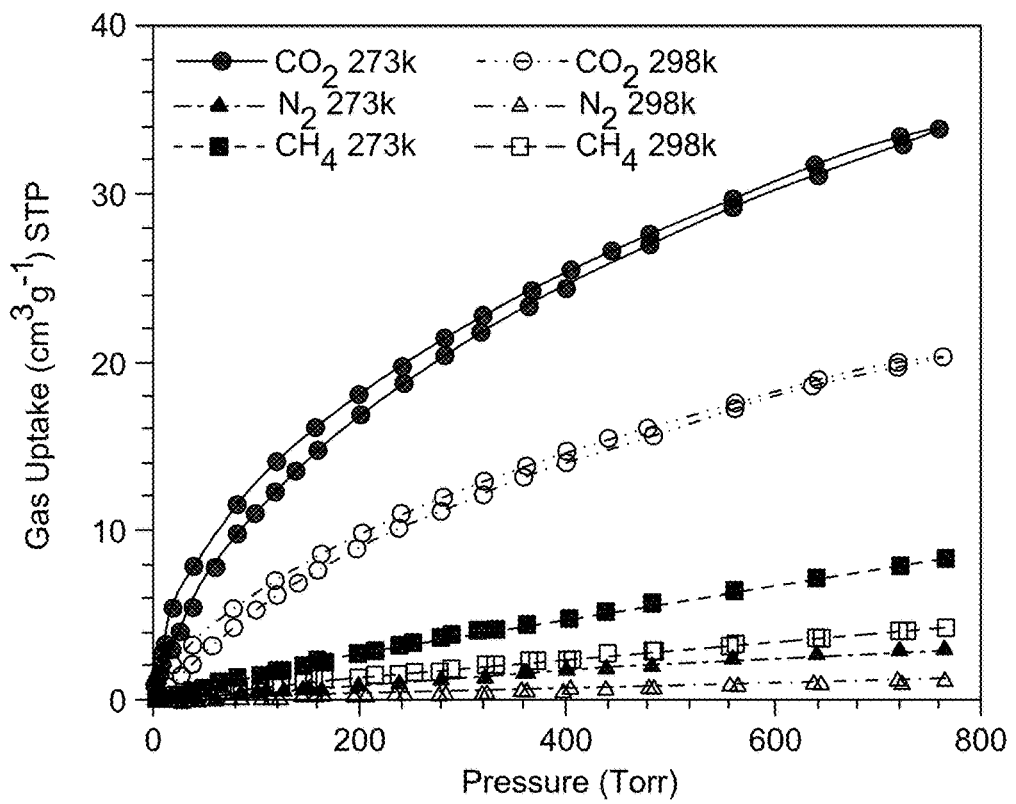
FIG. 8 shows $CO_2$, $N_2$, and $CH_4$ adsorption isotherms of a sulfur containing cross-linked porous polymer at 273 K and 298 K, according to certain embodiments.

Referring to FIG. 8, $CO_2$, $N_2$, and $CH_4$ adsorption isotherms at 273 K and 298 K for the synthesized polymer are shown. The uptake values of $CO_2$ at 273 K and 298 K are 34 and 20 cc/g, respectively.

Figure 9:
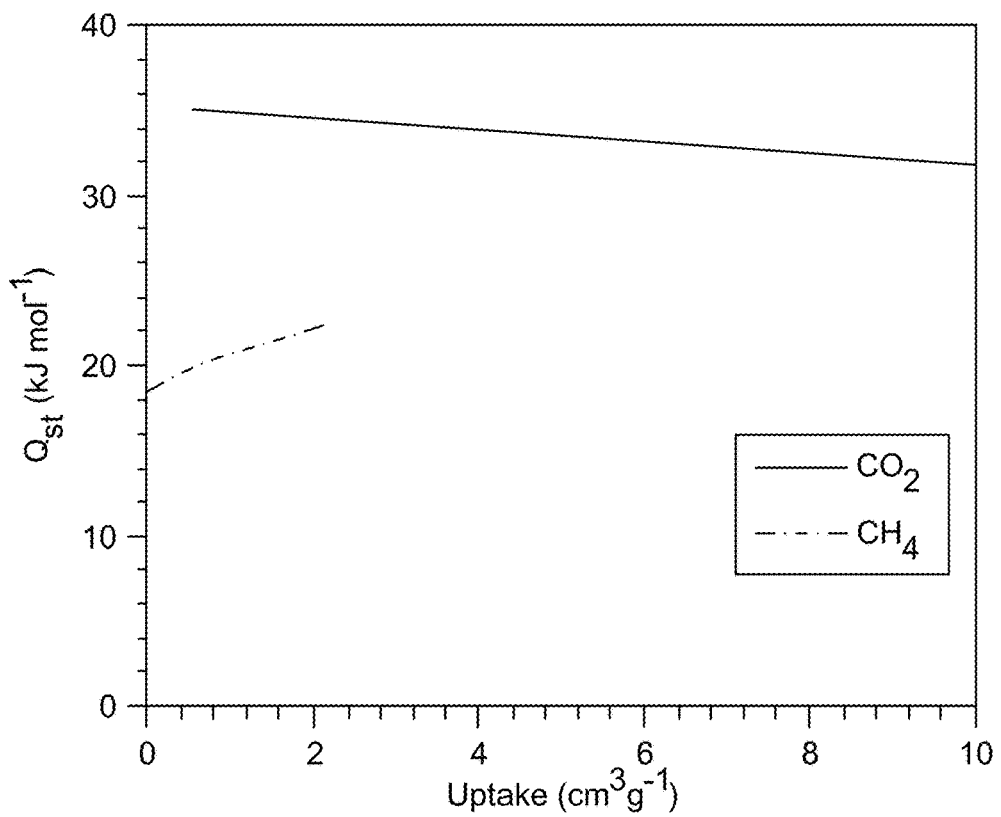
FIG. 9 shows a plot for isosteric heat of absorption of a sulfur containing cross-linked porous polymer for $CO_2$ and $CH_4$, according to certain embodiments.

From the adsorption isotherms, the isosteric heat of adsorption of $CO_2$ and $CH_4$ was calculated by virial method. Referring to FIG. 9, isosteric heat of adsorption ($q_{st}$) of the synthesized polymer for $CO_2$ and $CH_4$ is shown. The $q_{st}$ value for $CO_2$ and $CH_4$ was found to be 32 kJ/mol and 18 kJ/mol, respectively. The $CO_2$ $q_{st}$ value with the complete reversible uptake is considered to be preferable for $CO_2$ capture. The high $q_{st}$ value for $CO_2$ is correlated with the high concentration of nitrogen groups present in the synthesized polymer. The $q_{st}$ value for $CH_4$ is also considered to be high as noted in FIG. 9. The $q_{st}$ value for $CH_4$ increases with the increase in coverage, and that could be explained by cooperative interactions between $CH_4$ molecules, leading to an increase in the $q_{st}$ value.

Example 8

Breakthrough Experiments of $CO_2$

For breakthrough experiments, measuring the adsorption performance of the cross-linked porous polymer, synthesized in example 1, a fixed absorbent stainless steel column having 4 mm inner diameter, 6 mm outer diameter and 20 cm length was used. The column was filled with a sample (1.2 g) of the synthesized polymer. The column downstream was monitored using a mass spectrometer. Check valves, a bypass line (for calibrating the gas concentrations that were fed to the mass spectrometer), a heater jacket and a vacuum pump (for regeneration purposes) were used. For obtaining wet gas streams with 91% relative humidity (RH), the gas mixtures were passed through a water vapor saturator (humidifier) at 25° C. until desired saturation was obtained, as detected by mass spectrometry.

For evaluating the efficiency and selectivity of the synthesized polymer towards the capture of $CO_2$, an activated sample was exposed to a stream of a gaseous mixture of 10%

(v/v) CO$_2$ and 90% (v/v) CH$_4$. The effluent gas was monitored for breakpoint in the breakthrough time by the online mass spectrometer. The breakthrough time was calculated based on the breakpoint when the concentration of CO$_2$ exiting the column was equal to 5% the original concentration.

Figure 10:
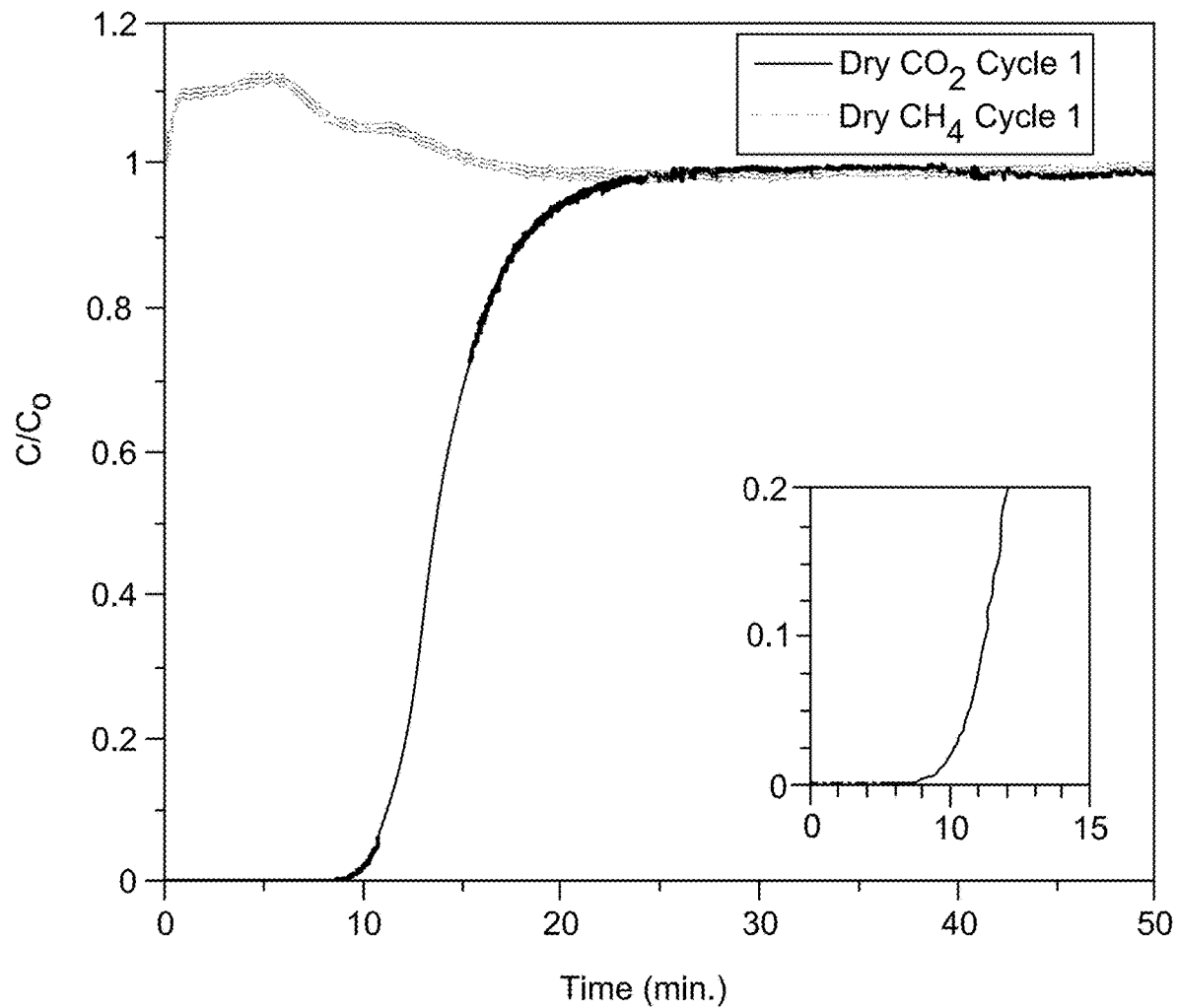
FIG. 10 shows breakthrough curves for adsorption of $CO_2$ and $CH_4$ onto a sulfur containing cross-linked porous polymer in dry conditions, according to certain embodiments.

Referring to FIG. 10, breakthrough curves for adsorption of CO$_2$ and CH$_4$ onto the synthesized polymer in dry conditions are shown. The dynamic uptake capacity of 8.9 cc/g in dry conditions is observed.

Figure 11:
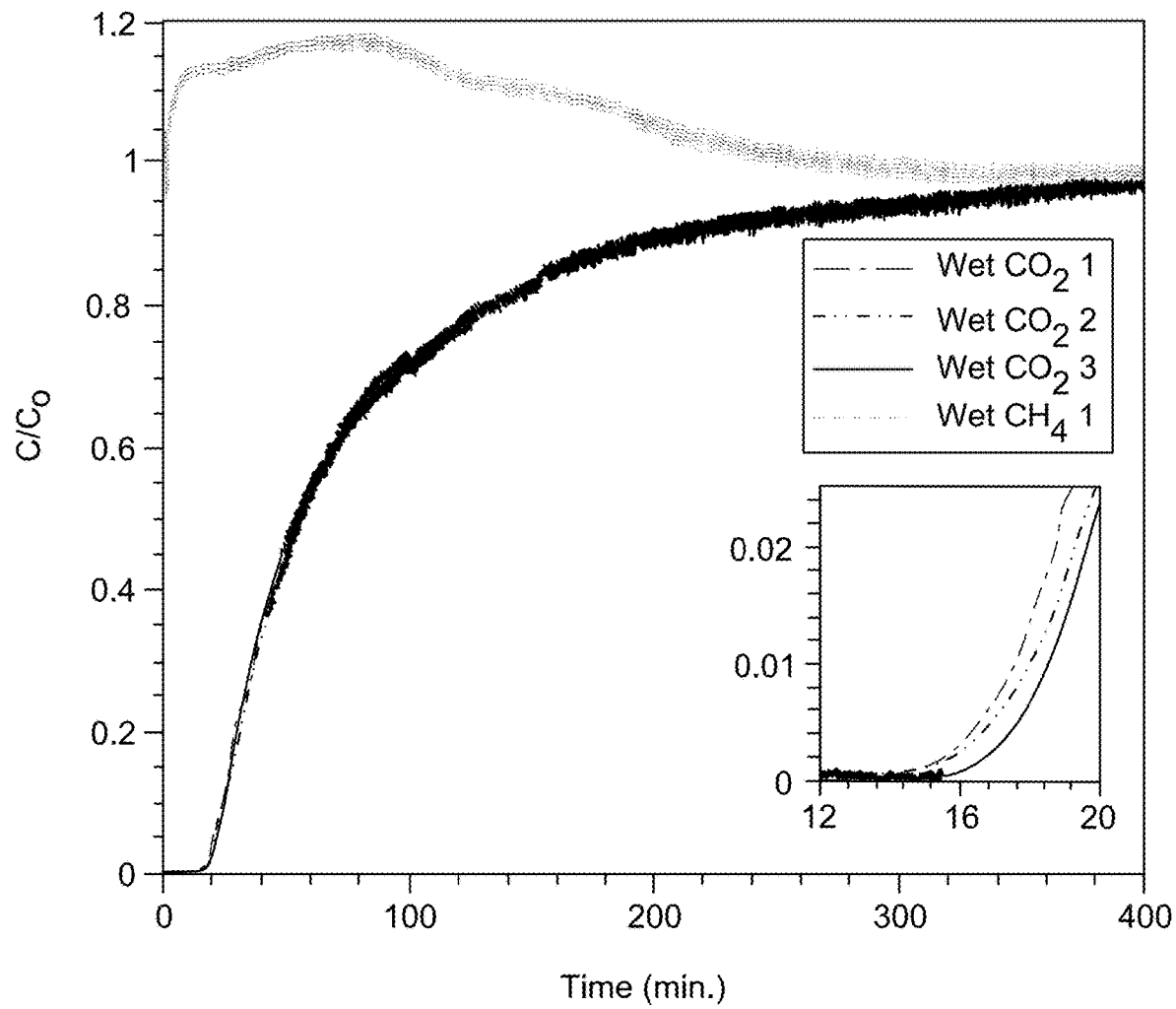
FIG. 11 shows breakthrough curves for adsorption of $CO_2$ and $CH_4$ onto a sulfur containing cross-linked porous polymer in wet conditions, according to certain embodiments; and, FIG. 12 shows breakthrough curves for adsorption of $H_2S$ present in a $CH_4$ gas stream onto a sulfur containing cross-linked porous polymer, for three cycles, according to certain embodiments.

Referring to FIG. 11, breakthrough curves for adsorption of CO$_2$ and CH$_4$ onto the synthesized polymer in wet conditions (91% Relative Humidity) are shown. The uptake capacity almost doubled in the wet breakthrough experiment, without loss in activity, with an average of 18.3 cc/g. The results indicate high potential of the synthesized polymer and its ability in separation of CO$_2$ from natural gas streams.

Example 9

Breakthrough Experiments of H$_2$S

Breakthrough experiments for H$_2$S separation from natural gas streams were conducted at room temperature by packing a sample of the synthesized polymer (0.5 g) into a column having an inner diameter of approximately 2 mm and a length of 20 cm. Quartz was used at the column ends to keep the synthesized polymer inside the column. A sample of methane gas containing 0.2% H$_2$S was passed through the column at a rate of 10 ml/min. The outlet H$_2$S was detected by gas chromatography. Excess gas from the outlet was allowed to be adsorbed into a NaOH solution for safety.

Figure 12:
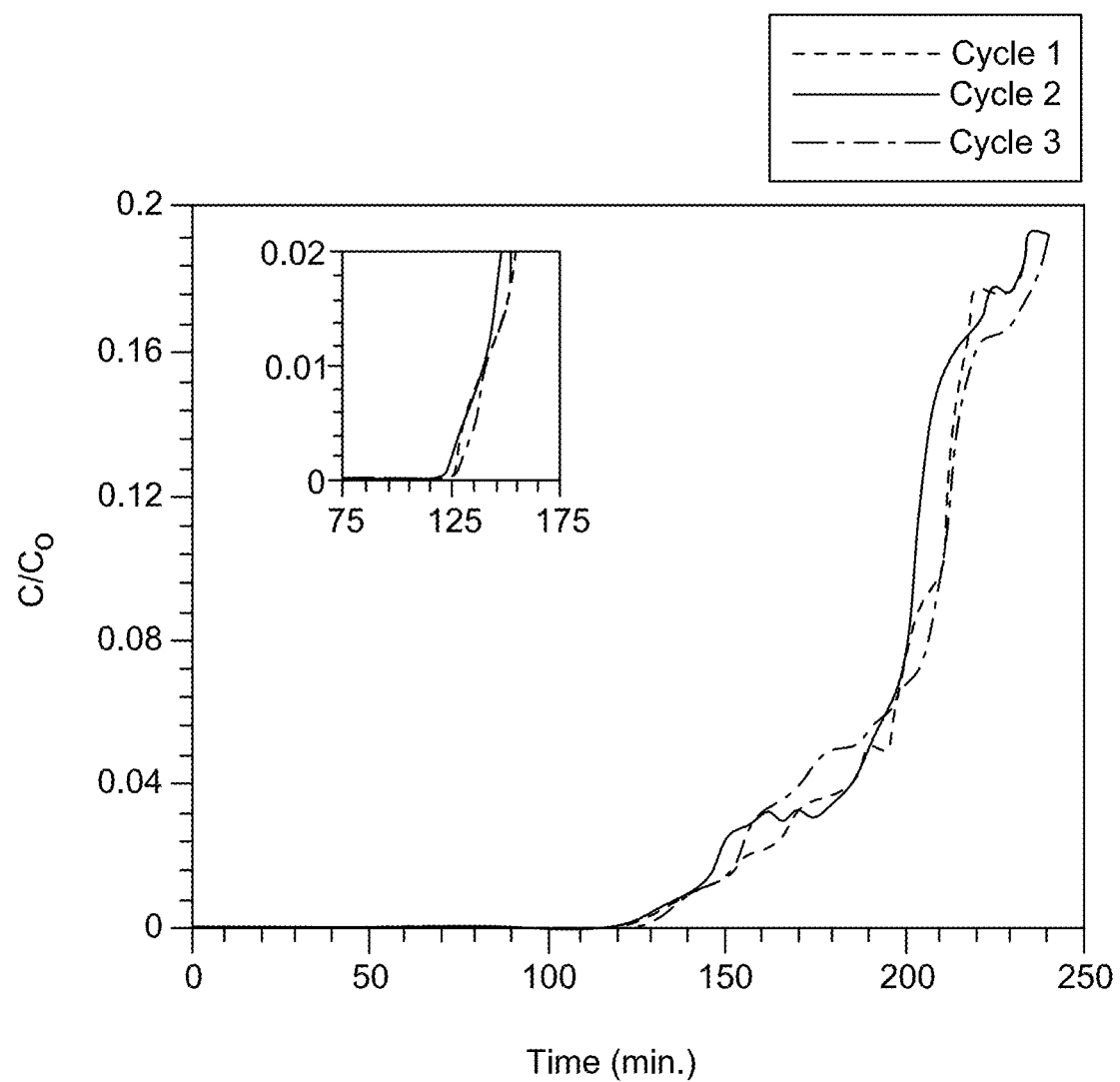

Referring to FIG. 12, breakthrough curves for adsorption of H$_2$S present in a CH$_4$ gas stream onto the synthesized polymer, for three cycles, are shown. Breakthrough point (5% of the original concentration) at around 160 min is observed which is equivalent to an adsorption capacity of 9.71 mg/g. The high adsorption capacity could be attributed to the presence of amine and thiol groups which could attract H$_2$S by electrostatic attraction caused by hydrogen bonding between H$_2$S and the amine/thiol groups. Regeneration of the spent polymer was performed by flowing nitrogen at 60° C. for 1 hour. The polymer exhibited 100% regeneration upon completion of the regeneration time.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method to form a sulfur containing cross-linked porous polymer, comprising:
   mixing an aldehyde and a first solvent to form a first mixture;
   mixing an organosulfur phenol and an aromatic compound with the first mixture to form a phenol mixture;
   heating the phenol mixture in the presence of an acid to form a solid; and
   drying the solid to obtain the sulfur containing cross-linked porous polymer;
   wherein the sulfur containing cross-linked porous polymer has repeat pyrrole units bonded to one another, and the sulfur containing cross-linked porous polymer has a thiol group which separates non-adjacent pyrrole units;
   wherein after the drying the sulfur containing cross-linked porous polymer is in a form of solid particles having a spherical particle structure.

2. The method of claim 1, wherein the aldehyde is p-formaldehyde;
   the first solvent is dimethylformamide (DMF);
   the phenol is a thiophenol;
   the aromatic compound is a pyrrole;
   the acid is hydrochloric acid (HCl);
   the drying is carried out at a temperature of from a range of 323 K to 363 K.

3. The method of claim 1, further comprising washing the solid with ammonium hydroxide, water, and methanol.

4. The method of claim 1, wherein the spherical particles are agglomerated, and the sulfur containing cross-linked porous polymer is amorphous.

5. The method of claim 1, wherein the spherical particles have a surface area of from 300 m$^2$/g to 500 m$^2$/g.

6. The method of claim 1, wherein the sulfur containing cross-linked porous polymer has an adsorption capacity of from 5 mg/g to 50 mg/g.

7. The method of claim 1, wherein the sulfur containing cross-linked porous polymer has a regeneration capacity of from 90% to 100%.

8. The method of claim 1, wherein the sulfur containing cross-linked porous polymer has a regeneration temperature of from 45° C. to 65° C.

9. The method of claim 1, wherein the sulfur containing cross-linked porous polymer has a microporous pore size distribution of at most 20 Å.

10. The method of claim 1, wherein the sulfur containing cross-linked porous polymer has a mesoporous pore size distribution of at most 50 Å.

11. The method of claim 1, wherein the sulfur containing cross-linked porous polymer has an isosteric heat of adsorption of CO$_2$ of from 20 KJ/mol to 80 KJ/mol.

12. The method of claim 1, wherein the sulfur containing cross-linked porous polymer has an uptake value of CO$_2$ at 273 K of from 10 cc/g to 60 cc/g.

13. The method of claim 1, wherein the sulfur containing cross-linked porous polymer has an uptake value of CO$_2$ at 298 K of from 10 cc/g to 30 cc/g.

14. The method of claim 1, wherein the sulfur containing cross-linked porous polymer has a dynamic uptake capacity of CO$_2$ of from 5 cc/g to 25 cc/g in dry conditions, wherein the dry conditions comprise of from a 1% relative humidity (RH) to a 10% RH.

15. The method of claim 1, wherein the sulfur containing cross-linked porous polymer has a dynamic uptake capacity of CO2 of from 10 cc/g to 30 cc/g in wet conditions, wherein the wet conditions comprise of from a 90% RH to 100% RH.

* * * * *